United States Patent
Sako

(10) Patent No.: US 10,055,174 B2
(45) Date of Patent: Aug. 21, 2018

(54) INFORMATION PROCESSING APPARATUS, METHOD, AND STORAGE MEDIUM STORING PROGRAM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/455,554

(22) Filed: Mar. 10, 2017

(65) Prior Publication Data

US 2017/0277481 A1    Sep. 28, 2017

(30) Foreign Application Priority Data

Mar. 24, 2016  (JP) .................................. 2016-060900

(51) Int. Cl.
*G06F 3/12* (2006.01)
*H04N 1/00* (2006.01)

(52) U.S. Cl.
CPC ............ *G06F 3/1206* (2013.01); *G06F 3/123* (2013.01); *G06F 3/1247* (2013.01); *G06F 3/1288* (2013.01); *H04N 1/0097* (2013.01); *H04N 1/00344* (2013.01); *H04N 2201/0094* (2013.01)

(58) Field of Classification Search
CPC ...... G06F 3/1206; G06F 3/123; G06F 3/1247; G06F 3/1288; H04N 1/00344; H04N 1/0097; H04N 2201/0094

USPC ......................................................... 358/1.13
See application file for complete search history.

(56) References Cited

U.S. PATENT DOCUMENTS

| | | | |
|---|---|---|---|
| 8,477,350 B2* | 7/2013 | Jazayeri | G06F 3/1204 358/1.15 |
| 2001/0013954 A1* | 8/2001 | Nagai | H04N 1/00408 358/444 |
| 2007/0080776 A1* | 4/2007 | Suwabe | G06F 8/65 340/5.2 |
| 2011/0134471 A1* | 6/2011 | Kimura | G06F 3/1203 358/1.15 |
| 2011/0235114 A1* | 9/2011 | Saitoh | H04N 1/00233 358/1.15 |
| 2012/0033254 A1* | 2/2012 | Numata | G06F 3/1213 358/1.15 |
| 2012/0257248 A1* | 10/2012 | Sato | G06F 8/65 358/1.15 |
| 2016/0261771 A1* | 9/2016 | Fujii | H04N 1/00244 |

FOREIGN PATENT DOCUMENTS

| | | |
|---|---|---|
| JP | 2013522774 T | 6/2013 |
| WO | 2011115987 A | 9/2011 |

* cited by examiner

*Primary Examiner* — Allen H Nguyen
(74) *Attorney, Agent, or Firm* — Fitzpatrick, Cella, Harper & Scinto

(57) ABSTRACT

A version of a web service supported by an information processing apparatus before a firmware update and a version of the web service supported by the information processing apparatus after the firmware update are compared, and, based on a result of the comparison, predetermined processing corresponding to a case in which the versions differ is performed.

11 Claims, 14 Drawing Sheets

FIG. 5

| | ID | VALUE |
|---|---|---|
| 501 | CLOUD PRINT OPERATION VERSION | 1(1.0) / 2(2.0) / 3(3.0) |
| 502 | CLOUD PRINT REGISTRATION STATUS | 0 (NOT REGISTERED) / 1 (REGISTERED) |
| 503 | CLOUD PRINT USER ID | ARBITRARY CHARACTER SEQUENCE |

"CLOUD PRINT VERSION HAS BEEN UPDATED.
THE REGISTERED CLOUD PRINTER
CAN NO LONGER BE USED.
PLEASE DELETE THE CLOUD PRINTER,
AND REGISTER IT AGAIN.
DELETE REGISTERED CLOUD PRINTER?"

1104 YES     1105 NO

1102

"THE REGISTERED CLOUD PRINTER WAS DELETED.
PERFORM CLOUD PRINT REGISTRATION NEXT?
THE USER ID WHEN REGISTERING IS BELOW."
USER ID: aaa@gmail.com

1106 YES     1107 NO

1103

CLOUD PRINT REGISTRATION WAS PERFORMED.

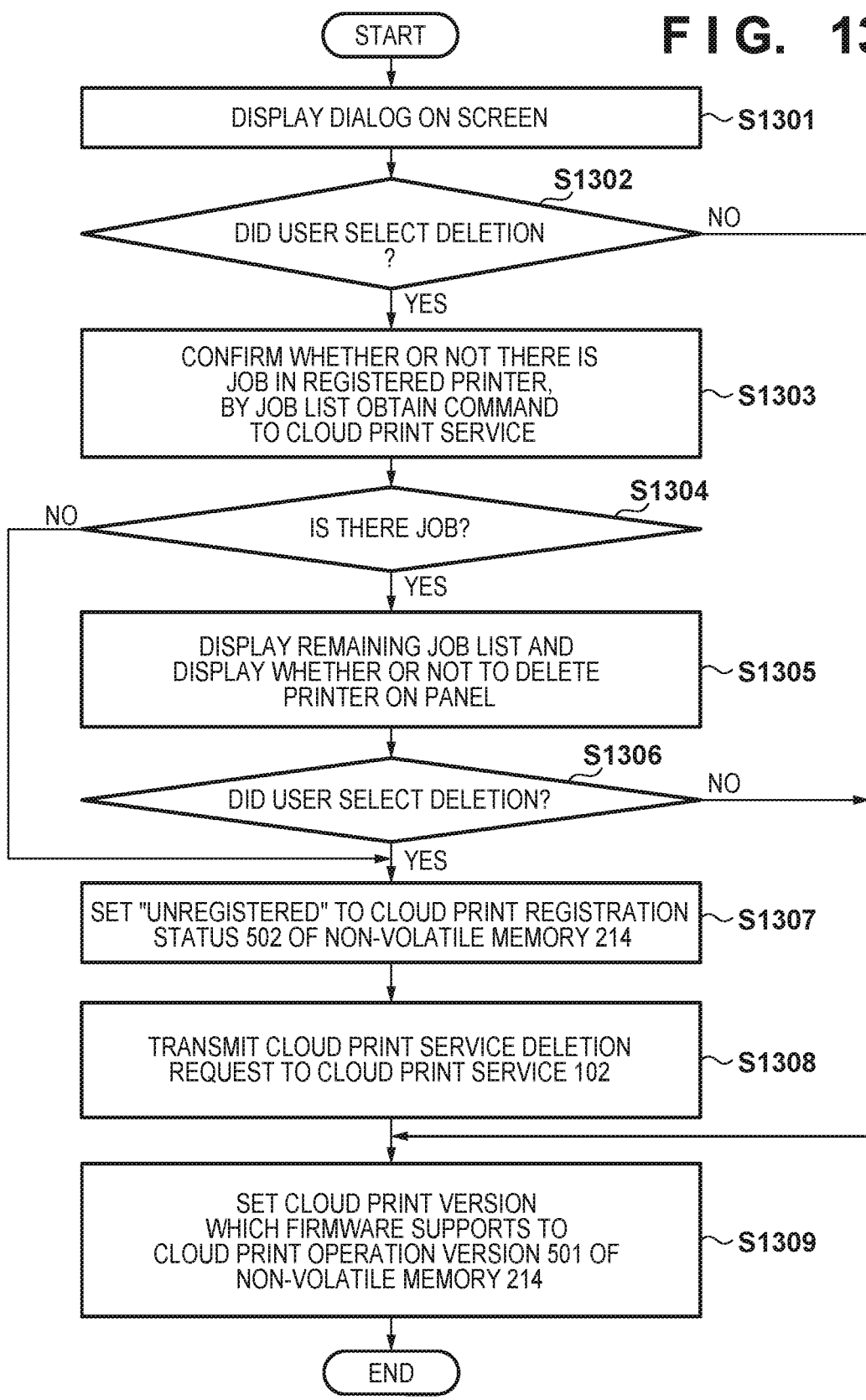

INFORMATION PROCESSING APPARATUS, METHOD, AND STORAGE MEDIUM STORING PROGRAM

BACKGROUND OF THE INVENTION

Field of the Invention

The present invention relates to an information processing apparatus registered to a web service, a method, and a storage medium storing a program.

Description of the Related Art

A user can print a document by transmitting document data to a printing apparatus from a client terminal such as a PC. In contrast, it is also possible to print a document by using a cloud print service provided on the Internet (Web) such as Google Cloud Print (registered trademark) by Google (registered trademark). Japanese Patent Laid-Open No. 2013-522774 recites that a printing apparatus registers itself (the apparatus) to a cloud print service in accordance with a request from a client terminal. After registering itself, printing of a document is performed by the printing apparatus when the client terminal transmits document data to the cloud print service.

In addition, by the printing apparatus, when registering itself, notifying a version of the cloud print service supported by the apparatus, the cloud print service providing a function of that version to a user of the printing apparatus is performed conventionally.

For an information processing apparatus such as a printing apparatus, a firmware update to add a new function may be performed, and a user can use the new function after the firmware update. However, conventionally, sufficient examination is not performed for a firmware update of an information processing apparatus already registered to a web service.

A firmware update may include an update of a version of a web service supported by the apparatus. A version update of the web service often includes an update (or a change) of an API of the web service that the apparatus supports, and by using the newest API after the update it becomes possible to use new functions of the web service.

For example, by a firmware update, the API of the cloud print service that the printing apparatus supports is updated from the previous version to the new version. In such a case the following problems can arise. In spite of the fact that the printing apparatus supports the API of the new version, it is registered to the cloud print service as a printing apparatus that supports the API of the previous version. Thus the functions provided by the cloud print service remain as the previous version, and functions of the new version cannot be used in the printing apparatus. In addition, if there is no compatibility between the new and previous versions in the cloud print service itself, even functions of the previous version of the cloud print service that could be used before the update cannot be used in the printing apparatus, which supports only the API of the new version.

SUMMARY OF THE INVENTION

The present invention provides processing for which consideration is given to versions of a web service supported before and after a firmware update, in an information processing apparatus registered to the web service.

The present invention in one aspect provides an information processing apparatus registered to a web service for communication with the web service, the apparatus comprising: a memory configured to store instructions, and a processor configured to execute the instructions to: perform an update of a firmware of the information processing apparatus for communication with the web service, obtain a version of the web service supported by the information processing apparatus before the update as a first version; obtain a version of the web service supported by the information processing apparatus after the update as a second version; compare the first version and the second version and, based on a result of the comparison, perform predetermined processing for a case when the first version and the second version differ from each other.

By virtue of the present invention, it is possible to perform processing for which consideration is given to versions of a web service supported before and after a firmware update, in an information processing apparatus registered to the web service.

Further features of the present invention will become apparent from the following description of exemplary embodiments with reference to the attached drawings.

BRIEF DESCRIPTION OF THE DRAWINGS

FIG. 5 is a view for describing data stored in a non-volatile memory of the image forming apparatus.

FIG. 11 is a view illustrating a dialog that is displayed.

FIG. 13 is a flowchart illustrating processing when a screen that can accept a deletion instruction is displayed.

DESCRIPTION OF THE EMBODIMENTS

Figure 1:
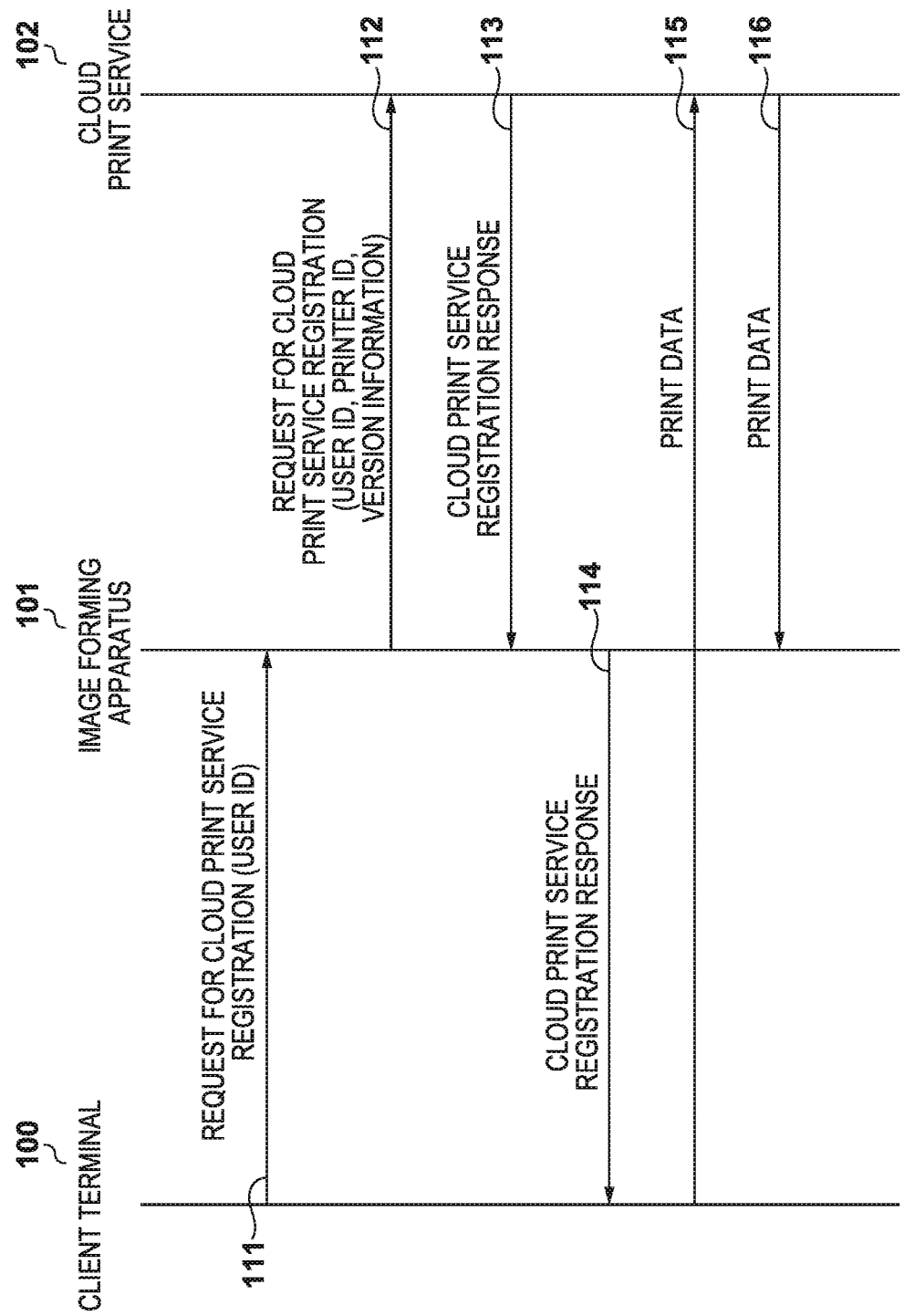
FIG. 1 is a view illustrating a processing sequence in a cloud print service.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 is a view illustrating an example of a processing sequence of Google Cloud Print (registered trademark). An image forming apparatus 101 which is an example of an information processing apparatus supports a Google Cloud Print (registered trademark) function, and a client terminal 100 supports a Google Cloud Print client function. In addition, a cloud print service 102 is an example of a web service on the Internet (the Web), and represents a supply source of a cloud print service. The image forming apparatus 101 in the present embodiment is, for example, an MFP (MultiFunctional Peripheral) that can execute a print function, a read (scan) function, or the like. However, it may be an apparatus of another form, such as an SFP (Single Functional Peripheral) if it can execute a print function. In addition, the client terminal 100 is a mobile terminal or a PC, for example.

For the image forming apparatus 101 to communicate with the web service, there is a need for a user to perform processing to register the image forming apparatus 101 to the web service in accordance with a sequence that is explained below. A user first transmits a request for cloud print service registration 111 from the client terminal 100 to the image forming apparatus 101. The request for cloud print service registration 111 includes a user ID of the service. Upon receiving the request for cloud print service registration 111, the image forming apparatus 101 transmits a request for cloud print service registration 112 to the cloud print service 102. The request for cloud print service registration 112 includes a user ID, a printer ID, and cloud print version information. The user ID is the user ID included in the request for cloud print service registration 111. The printer ID is identification information such as a MAC address for uniquely identifying the image forming apparatus 101. The cloud print version information is version information of a cloud print service that the image forming apparatus 101 can support. In other words, the version information is information indicating a version of a cloud print service that the image forming apparatus 101 supports at the time of registration to the cloud print service. Upon receiving the request for cloud print service registration 112, the cloud print service 102 associates the user ID and the printer ID included therein, and registers the image forming apparatus 101 as an image forming apparatus that can execute Google Cloud Print. In addition, a cloud print version supported by the image forming apparatus 101 is simultaneously recognized from the version information included in the request for cloud print service registration 112. The cloud print service 102 responds to the image forming apparatus 101 with a registration result that indicates, for example, whether the registration succeeded or failed, in accordance with a cloud print service registration response 113.

Upon receiving the cloud print service registration response 113, the image forming apparatus 101 responds to the client terminal 100 with the detail thereof as a cloud print service registration response 114. The cloud print service registration response 114 includes information of the registration result to the cloud print service 102, for example. Upon receiving the cloud print service registration response 114, the client terminal 100 recognizes the image forming apparatus 101 as an image forming apparatus that can execute Google Cloud Print if the registration result is success.

A user transmits print data (a print job) 115 for which printing is desired to a logical printer on the cloud print service 102 that corresponds to the image forming apparatus 101. The cloud print service 102 converts received print data 115 into a data format that the image forming apparatus 101 can print. This conversion is an example of processing of a print job, and processing such as layout processing (2-in-1 or the like), or monochrome processing may also be performed in this conversion. The cloud print service 102 transmits the converted print data 116 to the image forming apparatus 101. The image forming apparatus 101 performs print processing based on the received print data 116.

Figure 2:
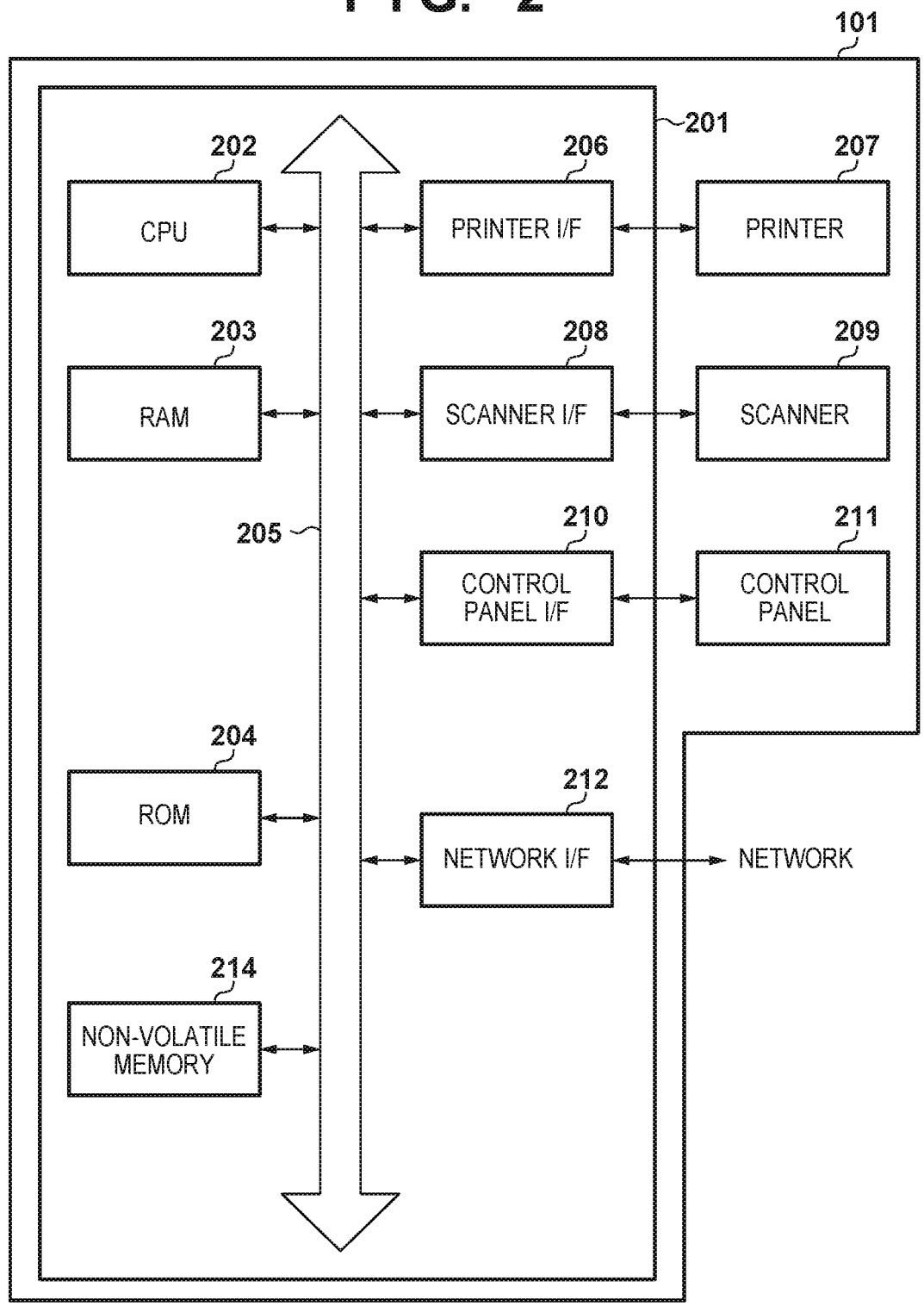
FIG. 2 is a block diagram illustrating a hardware configuration of an image forming apparatus.

FIG. 2 is a block diagram illustrating a hardware configuration of the image forming apparatus 101. A control unit (controller) 201 that includes a CPU 202 comprehensively controls operation of the image forming apparatus 101 overall. The CPU 202 performs various control such as communication control by reading a control program stored in a ROM 204. For example, operation of the present embodiment is realized by the CPU 202 reading a program stored in the ROM 204 into a RAM 203 and executing it. The RAM 203 is used as a temporary storage area such as a work area or a main memory or the CPU 202. A non-volatile memory 214 stores setting data, various information tables, or the like. The ROM 204 stores a program and data required for operation of the present embodiment, and for example also stores version information of current firmware of the image forming apparatus 101.

A printer interface (I/F) 206 is an interface between a printer 207 (a printer engine) and the control unit 201, and outputs a print image signal to the printer 207, for example. A scanner I/F 208 is an interface between a scanner 209 (a scanner engine) and the control unit 201, and inputs a read image signal from the scanner 209, for example. If the copy function is executed, the CPU 202 processes a read image signal input from the scanner I/F 208, and outputs a result to the printer I/F 206 as a print image signal.

A control panel I/F 210 is an interface between a control panel 211 and the control unit 201. The control panel 211 is provided with a keyboard, a display unit having a touch panel function, or the like. The display unit, for example, displays a setting screen or a user interface screen for illustrating a status or the like of a job or an apparatus state, and the control panel 211 accepts an instruction or a setting from a user in accordance with a keyboard or the like.

A network I/F 212 transmits information via a network to an external apparatus such as the client terminal 100 or the cloud print service 102, or receives various information via the network from these external apparatuses. The network I/F 212 has a configuration in accordance with a network medium. For example, the network I/F 212 has a configuration that supports Bluetooth or an NFC (Near Field Communication) standard.

Each block in the control unit 201 illustrated in FIG. 2 is communicably connected to one another via a system bus 205. The image forming apparatus 101 includes necessary blocks as appropriate, in accordance with a function that the image forming apparatus 101 can execute, and not just the blocks illustrated in FIG. 2. For example, an image processing unit configured as a chip for performing various image processing such as correction processing, enlargement/reduction, rotation, or conversion, with respect to image data read by the scanner 209 is appropriately included.

Figure 3:
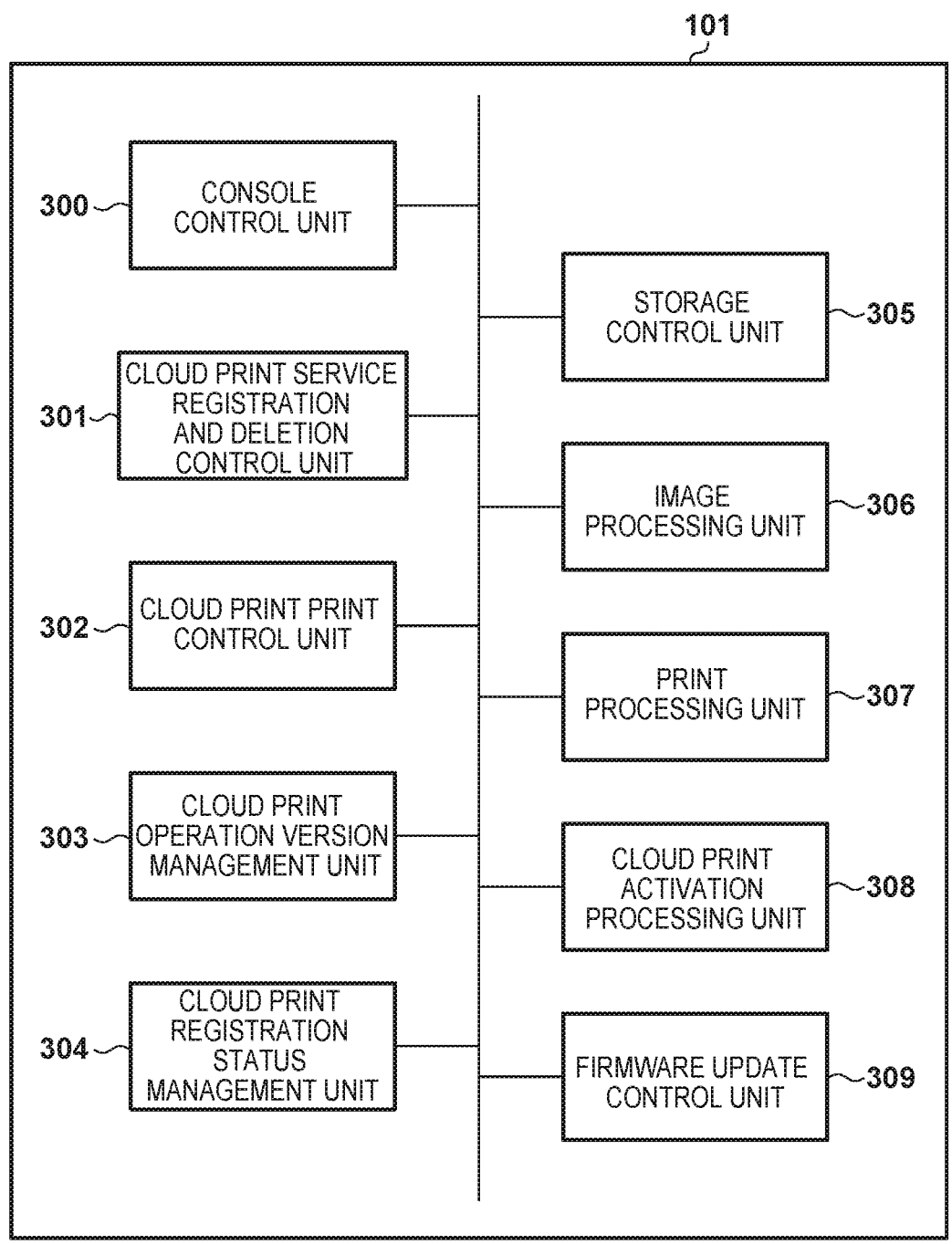
FIG. 3 is a block diagram illustrating a software configuration of the image forming apparatus.

FIG. 3 is a block diagram illustrating a software configuration of the image forming apparatus 101. Each block illustrated in FIG. 3 is, for example, realized by the CPU 202 of the image forming apparatus 101 executing a control program stored in the ROM 204.

A console control unit 300 controls operation of the control panel 211. For example, the console control unit 300 accepts instruction input from a user for causing an operation menu to be displayed on the control panel 211, communicates accepted instruction content to another block, and causes a result in accordance with the instruction to be displayed on the control panel 211.

A cloud print service registration and deletion control unit 301 transmits a request for cloud print service registration or a deletion request to the cloud print service 102. The request for cloud print service registration corresponds to the request for cloud print service registration 112 of FIG. 1, for example.

A cloud print print control unit 302 performs control for cloud print printing. For example, the cloud print print control unit 302 transfers the print data 116 received from the cloud print service 102 to an image processing unit 306 along with the print instruction. A cloud print operation version management unit 303 manages version information of a cloud print service supported by the firmware. A cloud print registration status management unit 304 saves and manages a cloud print registration status to the non-volatile memory 214. The cloud print registration status is version information of a cloud print service that is already registered to the cloud print service 102, for example.

A storage control unit 305, in accordance with an instruction from another block, writes designated data to the ROM 204 or the non-volatile memory 214, or reads data from the ROM 204 or the non-volatile memory 214. Data managed by the storage control unit 305 is, for example, version information of a cloud print service currently supported by the firmware of the image forming apparatus 101, or information stored in the non-volatile memory 214. The information stored in the non-volatile memory 214 is, for example, the information illustrated in FIG. 5.

The image processing unit 306 performs processing for rendering image data that is an execution target of a print job into data for which print processing is possible. A print processing unit 307 executes printing by transmitting, as a print image signal, data rendered by the image processing unit 306 to the printer 207 via the printer I/F 206.

A cloud print activation processing unit 308 determines, at a time of activation of the image forming apparatus 101, whether the cloud print version supported by the firmware that is stored in the ROM 204 or the like matches the cloud print version saved in the non-volatile memory 214. A firmware update control unit 309 performs a version update of the firmware of the image forming apparatus 101 in accordance with rewriting a control program stored in the ROM 204, for example. The image forming apparatus 101 of the present embodiment performs a restart of the image forming apparatus 101 in accordance with performing the update of the firmware. In the present embodiment, if the version of the cloud print service supported by the firmware has increased, a cloud print module of the new firmware inherits, at least, a cloud print deletion function of the cloud print service of the old version.

Figure 4:
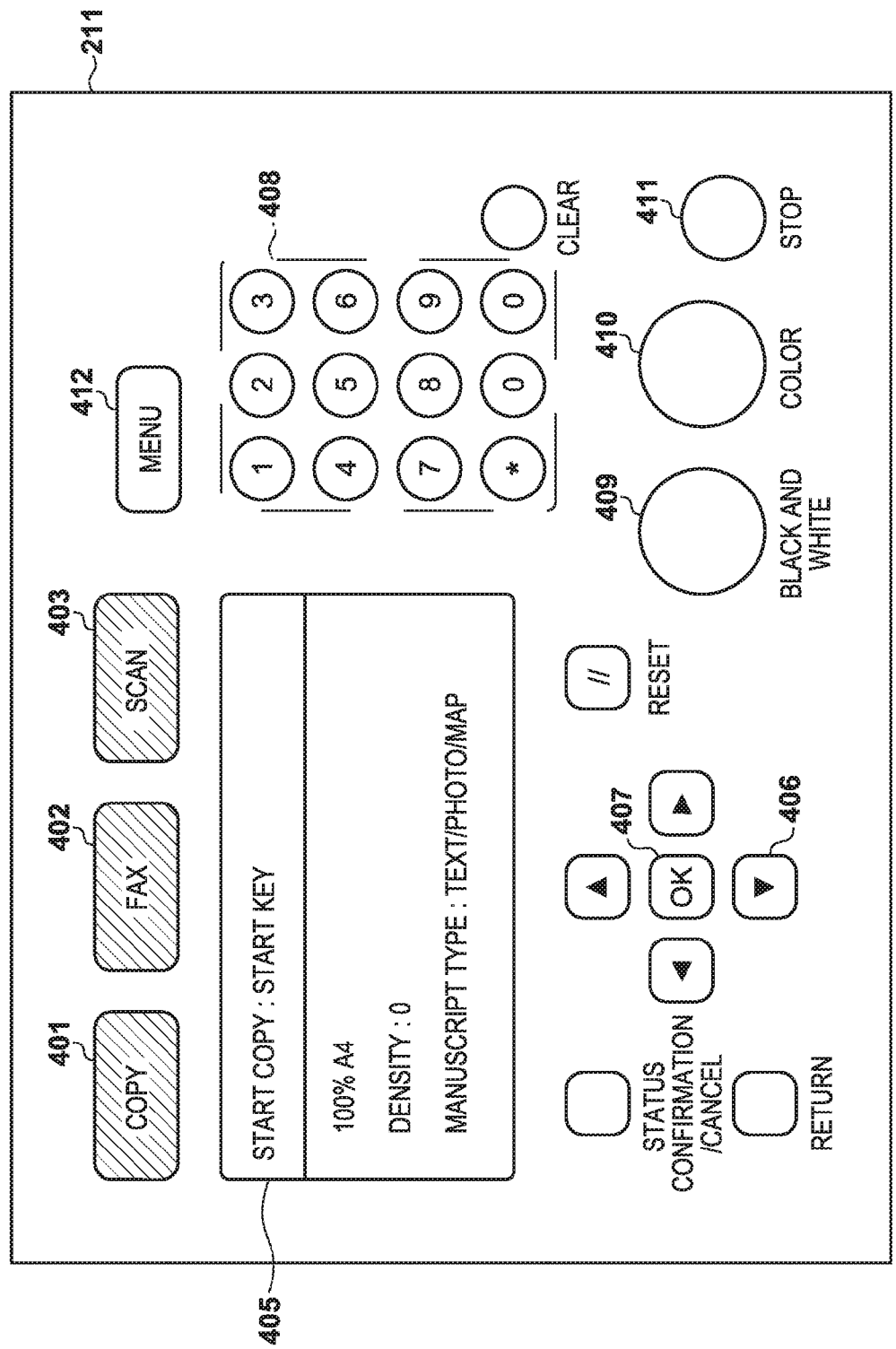
FIG. 4 is a view illustrating a console unit of the image forming apparatus.

FIG. 4 is a view illustrating an example of the control panel 211 of the image forming apparatus 101. A display panel 405 is a display panel configured by an LCD or the like. A button 401 is a button that is pressed when accepting an execution instruction for a copy function of the image forming apparatus 101, and by being pressed a copy operation screen is displayed on the display panel 405. A button 402 is a button that is pressed when accepting an execution instruction for a FAX function of the image forming apparatus 101, and by being pressed a FAX operation screen is displayed on the display panel 405. A button 403 is a button that is pressed when accepting an execution instruction for a scan function of the image forming apparatus 101, and by being pressed a scan operation screen is displayed on the display panel 405.

Keys 408 are a numeric keypad, and are used for accepting input of numbers or the like, such as input of a setting value. A key 407 is an OK key, and is used when finalizing display content of the display panel 405, for example. Keys 406 are directional keys, and are used when selecting a menu item displayed on the display panel 405, for example. A key 409 and a key 410 are used when accepting an execution instruction for black and white copy or a color copy, respectively. A key 411 is used when stopping processing. A key 412 is used when displaying a menu screen for performing setting of a function that the image forming apparatus 101 can execute.

FIG. 5 is a view for describing data stored in the non-volatile memory 214 of the image forming apparatus 101. A cloud print operation version 501 stores information indicating cloud print versions supported by the firmware of the image forming apparatus 101 at the time of a most recent activation. Therefore, the cloud print operation version 501 can also be said to store information indicating cloud print versions supported by the image forming apparatus 101 before an update of the firmware. In addition, the non-volatile memory 214 continues to hold this information before and after activation of the image forming apparatus 101 (before and after an update). For example, the value "1" is stored in the case of a version 1.0, the value "2" is stored in the case of a version 2.0, and the value "3" is stored in the case of a version 3.0. The cloud print activation processing unit 308 refers to values stored in the cloud print operation version 501, or writes the aforementioned values to the area for the cloud print operation version 501.

A cloud print registration status 502 stores information indicating a cloud print registration status. For example, if registration of the image forming apparatus 101 to the cloud print service 102 has not yet been performed the value "0" is stored, and if already registered the value "1" is stored. The cloud print service registration and deletion control unit 301 and the cloud print activation processing unit 308 refer to the value stored in the cloud print registration status 502, or write the aforementioned value to the area for the cloud print registration status 502.

A cloud print user ID 503 stores a user ID set in the request for cloud print service registration 112 that is transmitted from the client terminal 100 to the image forming apparatus 101. For example, a character sequence for identifying a user is stored. The cloud print service registration and deletion control unit 301 and the cloud print activation processing unit 308 refer to the value stored in the cloud print user ID 503, or write the aforementioned value to the area for the cloud print user ID 503.

Figure 6:
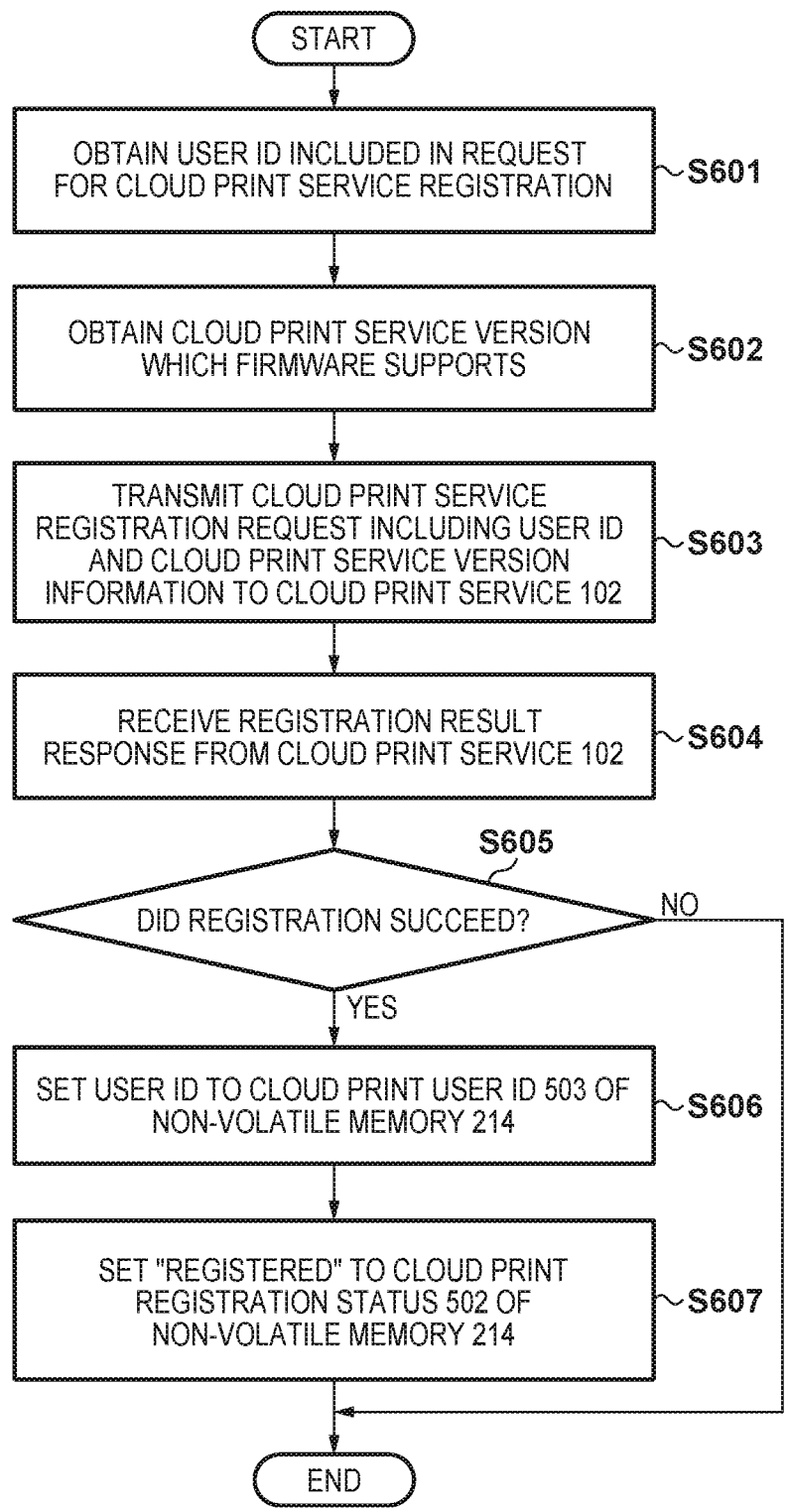
FIG. 6 is a flowchart illustrating processing at a time of reception of a request for cloud print service registration.

FIG. 6 is a flowchart illustrating a procedure of processing when the image forming apparatus 101 receives the request for cloud print service registration 111. For example, the processes of FIG. 6 is realized by the CPU 202 reading a program stored in the ROM 204 into the RAM 203 and executing it.

When the image forming apparatus 101 receives the request for cloud print service registration 111, the processing of step S601 is executed. In step S601, the CPU 202 obtains a user ID included in the request for cloud print service registration 111 by the cloud print service registration and deletion control unit 301 of the image forming apparatus 101.

In step S602, the CPU 202, by the storage control unit 305, obtains cloud print version information that the firmware of the image forming apparatus 101 supports. In step S603, the CPU 202 transmits the request for cloud print service registration 112 to the cloud print service 102 by the cloud print service registration and deletion control unit 301. Here, the request for cloud print service registration 112 includes the user ID obtained in step S601, the cloud print version information obtained in step S602, and a printer ID that uniquely identifies the image forming apparatus 101.

In step S604, the cloud print service registration and deletion control unit 301 receives the cloud print service registration response 113 from the cloud print service 102. In step S605, the cloud print service registration and deletion control unit 301 determines whether registration succeeded, based on the cloud print service registration response 113 received.

If it is determined that the registration succeeded, in step S606, the cloud print service registration and deletion control unit 301 stores the user ID as the value of the cloud print user ID 503. In step S607, the cloud print service registration and deletion control unit 301 stores a value indicating "registered" in the area for the cloud print registration status 502 of the non-volatile memory 214. After the processing of step S607, the processing of FIG. 6 terminates. Meanwhile, if it is determined in step S605 that registration failed, the processing of FIG. 6 terminates.

Figure 7:
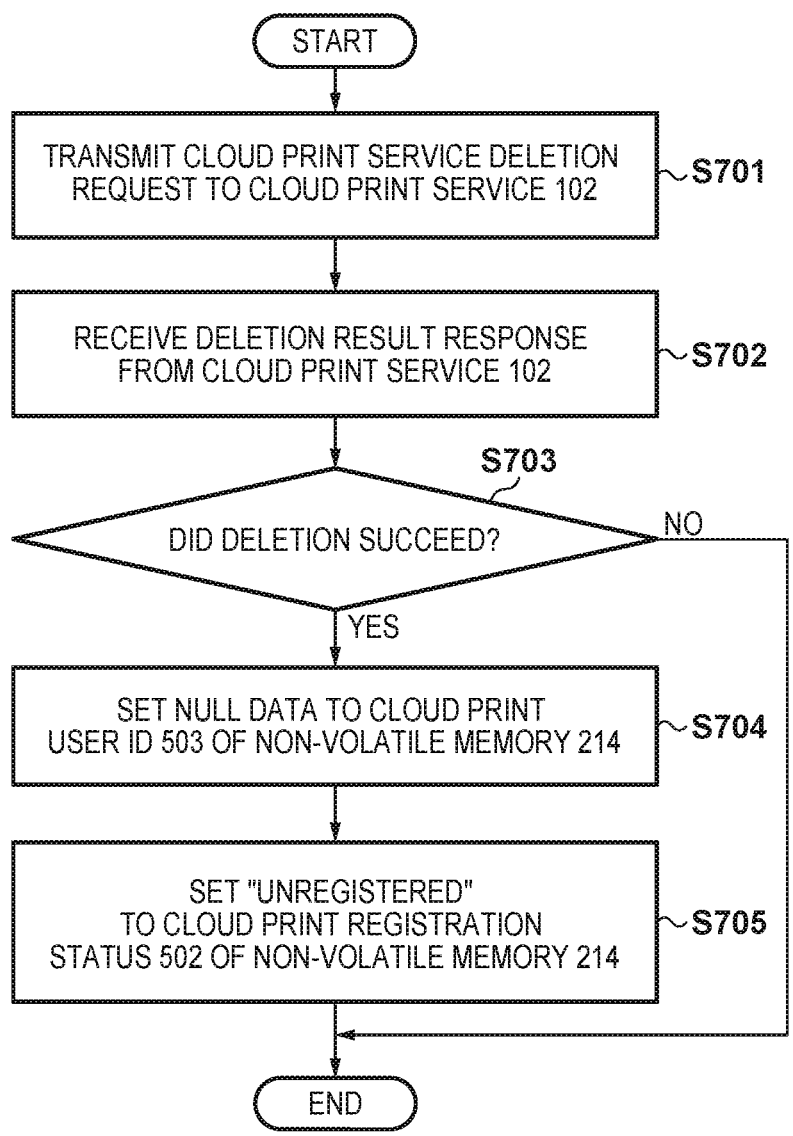
FIG. 7 is a flowchart illustrating processing at a time of acceptance of a cloud print deletion operation.

FIG. 7 is a flowchart illustrating a procedure of processing when the image forming apparatus 101 accepts a cloud print deletion operation. For example, each process of FIG. 7 is realized by the CPU 202 reading a program stored in the ROM 204 into the RAM 203 and executing it.

Upon accepting on the display panel 405 a cloud print deletion operation that is described later by FIG. 9, the processing of step S701 is executed. In step S701, the CPU 202 transmits the cloud print service deletion request to the cloud print service 102 by the cloud print service registration and deletion control unit 301.

In step S702, the CPU 202 receives a cloud print service deletion response from the cloud print service 102 by the cloud print service registration and deletion control unit 301. In step S703, the CPU 202, by the cloud print service registration and deletion control unit 301, determines whether deletion succeeded, based on the cloud print service deletion response received. Here, if it is determined that deletion succeeded, in step S704, the CPU 202 stores a NULL value in the area for the user ID 503 of the non-volatile memory 214, by the cloud print service registration and deletion control unit 301. In step S705, the CPU 202 stores, by the cloud print service registration and deletion control unit 301, a value indicating "unregistered" in the area for the cloud print registration status 502 of the non-volatile memory 214. After the processing of step S705, the processing of FIG. 7 terminates. Meanwhile, if it is determined in step S703 that deletion failed, the processing of FIG. 7 terminates. Note that a cloud print deletion operation is not limited to an operation from the display panel 405. For example, it may be performed by a remote operation from another apparatus or a mobile terminal.

Explanation is given below regarding processing for displaying on the display panel 405 a user interface screen for prompting deletion of a cloud print service.

Figure 8:
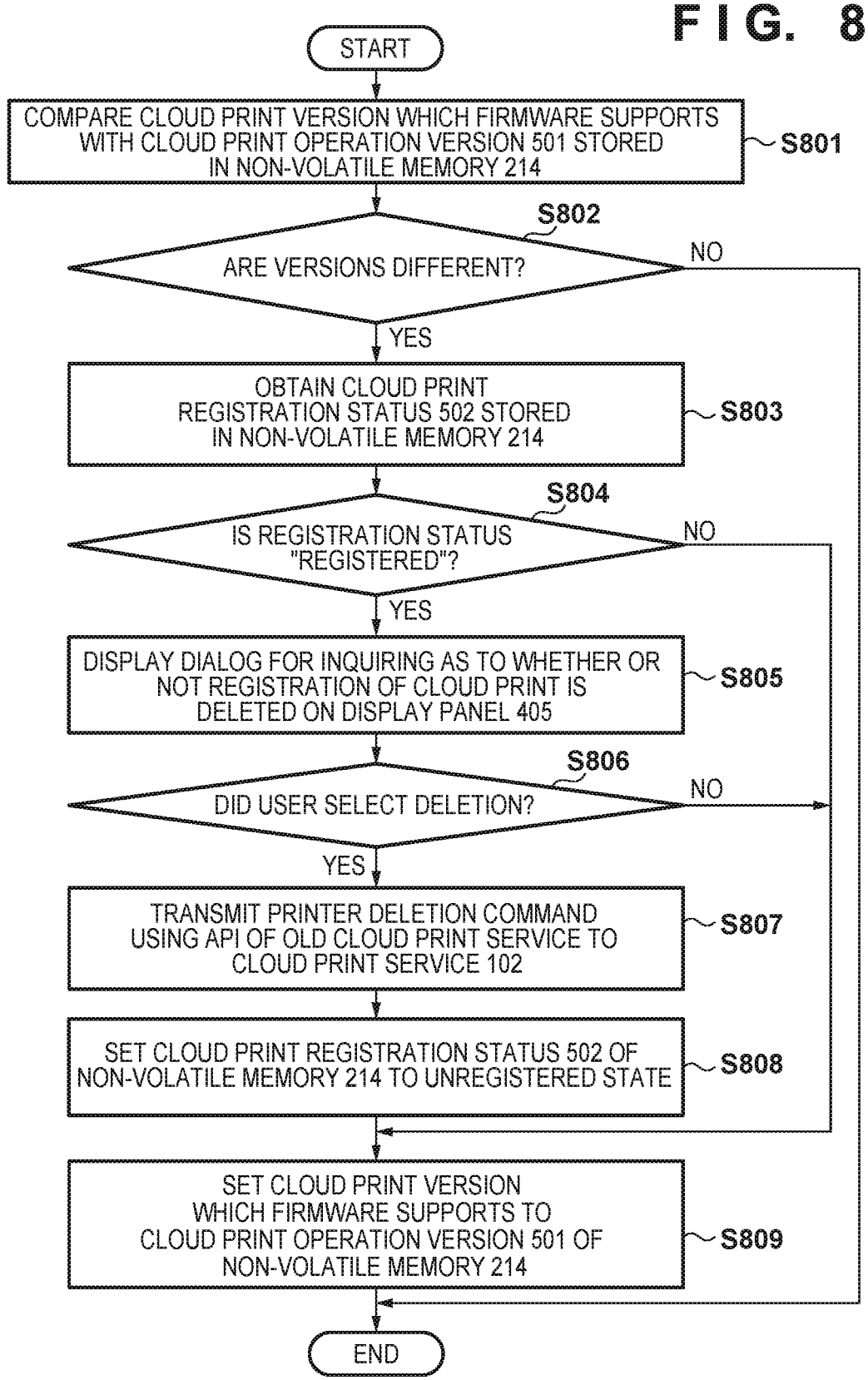
FIG. 8 is a flowchart illustrating processing at a time of activation of the image forming apparatus.

FIG. 8 is a flowchart illustrating processing when the image forming apparatus 101 activates, in the present embodiment. For example, each process of FIG. 8 is realized by the CPU 202 reading a program stored in the ROM 204 into the RAM 203 and executing it.

When the image forming apparatus 101 is activated, the processing of step S801 is executed. In step S801, the CPU 202, by the cloud print activation processing unit 308, compares the cloud print operation version 501 (the version before the update) stored in the non-volatile memory 214 and the cloud print version currently supported by the firmware of the image forming apparatus 101 (the version after the update). If the image forming apparatus 101 is activated in accordance with processing for updating the firmware, the processing of step S801 is processing that compares the version before the update with the version after the update. Note that the cloud print version supported by the firmware is obtained by the processing of step S801 examining the version or the firmware. In step S802, the CPU 202, by the cloud print activation processing unit 308, determines whether both versions differ. Here, if it is determined that the versions do not differ and are the same, the processing of FIG. 8 terminates. Meanwhile, if it is determined that the versions differ, the processing of step S803 onward is performed. In other words, the CPU 202 controls whether to perform certain processing of step S803 onward, in accordance with the determination of step S802. In step S803, the CPU 202, by the cloud print activation processing unit 308, obtains the value of the cloud print registration status 502 stored in the non-volatile memory 214. A case in which it is determined in step S802 that the versions differ is, for example, a case in which a memory medium storing the firmware of the new version is mounted.

In step S804, the CPU 202, by the cloud print activation processing unit 308, determines whether the obtained value is "registered". Here, if not "registered" is determined the processing proceeds to step S809, and if "registered" is determined the processing proceeds to step S805.

If not "registered" is determined, the processing proceeds to step S809. In step S809, the CPU 202, by the cloud print activation processing unit 308, stores the cloud print version information supported by the current firmware of the image forming apparatus 101 to the area for the cloud print operation version 501 of the non-volatile memory 214. After the processing of step S809, the processing of FIG. 8 terminates. If "registered" is determined in step S804, in step S805 the CPU 202, by the cloud print activation processing unit 308, displays on the display panel 405 a dialog screen for accepting an instruction of whether to delete the registration of the cloud print service.

Figure 9:
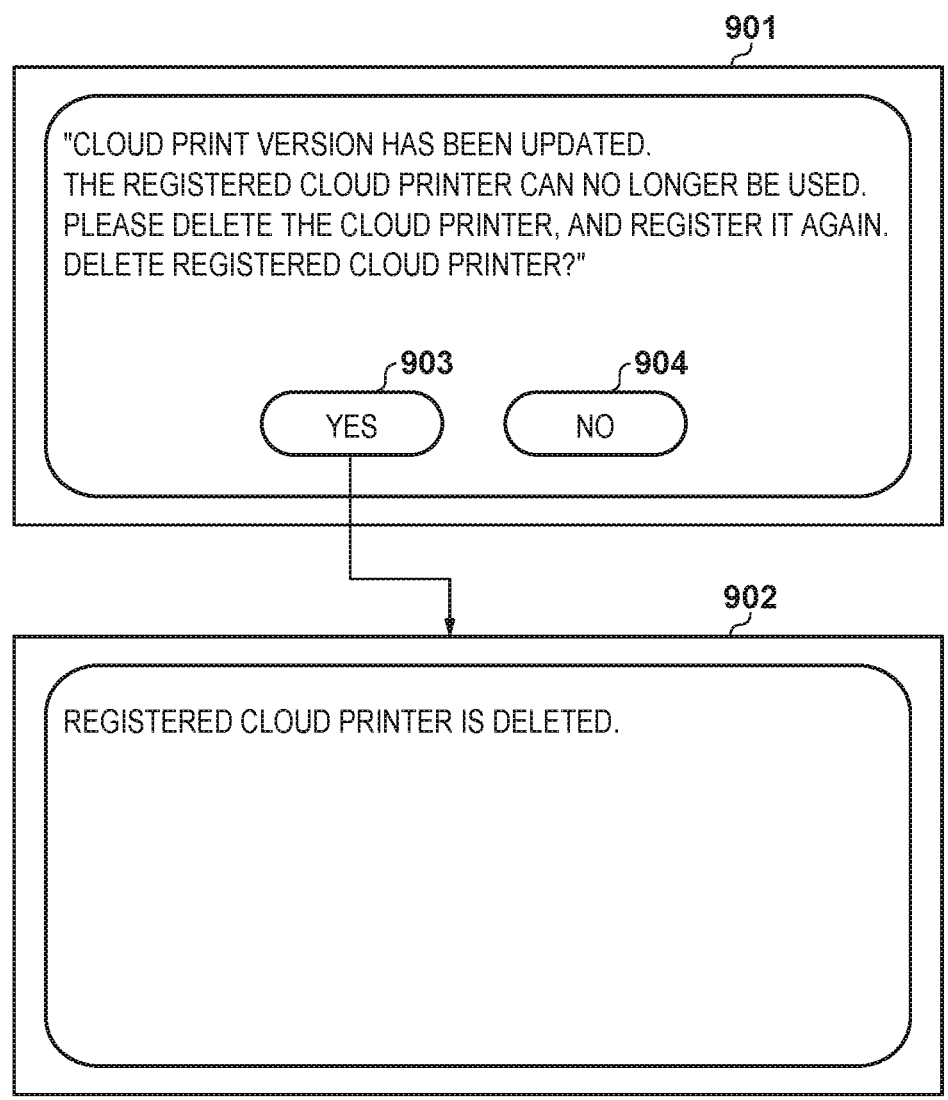
FIG. 9 is a view illustrating a dialog that is displayed.

FIG. 9 is a view illustrating an example of a dialog screen for accepting an instruction of whether to delete registration of a cloud print service. The console control unit 300 displays on the display panel 405 a screen 901 that can accept an instruction for deletion of registration of a cloud print service. As illustrated by the screen 901, an instruction, "Cloud print version has been updated. The registered cloud printer can no longer be used. Please delete the cloud printer and register it again.", is displayed on the screen. In other words, this message is a message that requests a user of an external terminal to issue the request for registration explained by FIG. 1, to register the image forming apparatus 101 after activation (after update of the cloud print version) to the cloud print service. The external terminal is the client terminal 100, for example. A button 903 and a button 904 are displayed on the screen 901. If the button 903 is pressed by a user, deletion of the registration of the cloud print service is performed. If the button 904 is pressed by a user, in step S806 the CPU 202 stores the cloud print version information currently supported by the firmware of the image forming apparatus 101 to the area for the cloud print operation version 501. Subsequently, the processing of FIG. 8 terminates.

When the button 903 on the screen 901 is pressed—in other words if a user instructed registration deletion, in step S807 the CPU 202, by the cloud print activation processing unit 308, transmits a printer deletion command to the cloud print service 102. Here, the CPU 202 uses the API corresponding to the cloud print service of the old version to transmit the printer deletion command. Upon receiving a transmission result for the printer deletion command, the CPU 202, by the console control unit 300, displays that result on the display panel 405. For example, if the transmission result is deletion success, the console control unit 300 displays a dialog screen as illustrated by a screen 902 on the display panel 405.

In step S808, the CPU 202 stores, by the cloud print activation processing unit 308, a value indicating "unregistered" in the area for the cloud print registration status 502 of the non-volatile memory 214. In step S809, the CPU 202, by the cloud print activation processing unit 308, stores the cloud print version information supported by the current firmware of the image forming apparatus 101 to the area for the cloud print operation version 501 of the non-volatile memory 214. Subsequently, the processing of FIG. 8 terminates.

By virtue of the present embodiment, if the firmware of the image forming apparatus 101 is updated and a version of the cloud print service that the image forming apparatus 101 can support changes, it is possible to prompt a user to delete the registration to the cloud print service. As a result, it is possible to prevent the cloud print service from unexpectedly becoming unusable due to an update of the firmware version.

In the present embodiment, by the processing of FIG. 8, the image forming apparatus 101 that was already registered to the cloud print service 102 is deleted. Upon receiving a request for registration from the client terminal 100, by the processing of FIG. 6, the current image forming apparatus 101 (including cloud print version information supported by the firmware) is registered to the cloud print service 102. In other words, in the present embodiment, the aforementioned operations are performed to cause the version supported by the current firmware of the image forming apparatus 101 and the version registered to the cloud print service to match.

In the explanation above, that the processing of step S801 starts at a time of activation of the image forming apparatus 101 was explained. However, configuration may also be taken such that the processing of step S801 is started when processing for performing a version update of the firmware of the image forming apparatus 101 is started, for example.

Second Embodiment

Next, regarding processing for displaying on the display panel 405 a dialog screen for prompting the deletion and addition of a cloud print service, explanation is given regarding points different to the first embodiment as a second embodiment.

Figure 10:
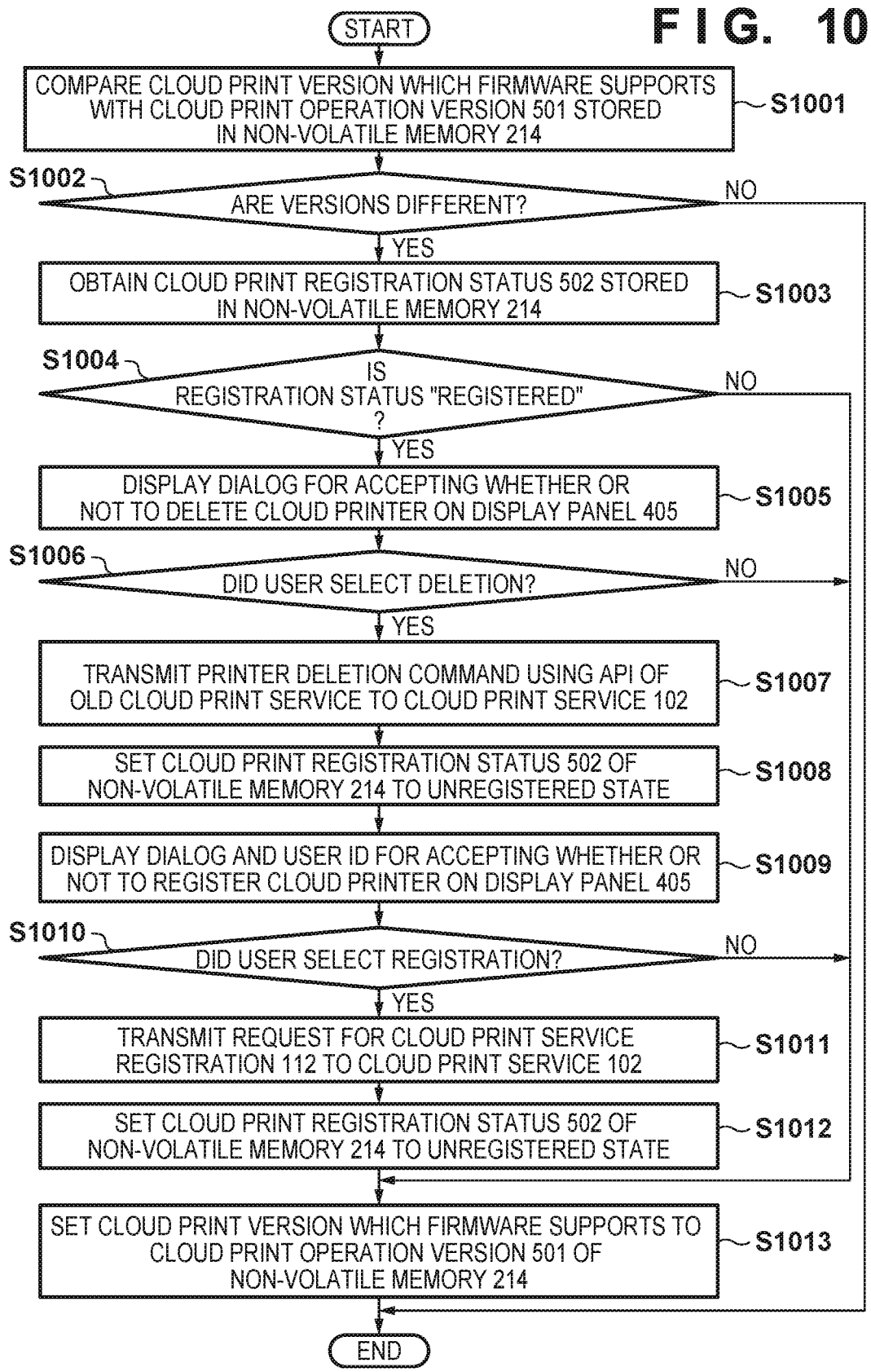
FIG. 10 is a flowchart illustrating processing at a time of activation of the image forming apparatus.

FIG. 10 is a flowchart illustrating processing when the image forming apparatus 101 activates, in the present embodiment. For example, each process of FIG. 10 is realized by the CPU 202 reading a program stored in the ROM 204 into the RAM 203 and executing it.

When the image forming apparatus 101 is activated, the processing of step S1001 is executed. In step S1001, the CPU 202, by the cloud print activation processing unit 308, compares the cloud print version supported by the current firmware of the image forming apparatus 101 with the cloud print operation version 501 of the non-volatile memory 214. In step S1002, the CPU 202, by the cloud print activation processing unit 308, determines whether both versions differ. Here, if it is determined that the versions do not differ and are the same, the processing of FIG. 10 terminates.

Meanwhile, if is determined that the versions are different, in step S1003 the CPU 202, by the cloud print activation processing unit 308, obtains the value of the cloud print registration status 502 stored in the non-volatile memory 214. In step S1004, the CPU 202, by the cloud print activation processing unit 308, determines whether the obtained value is "registered". Here, if not "registered" is determined the processing proceeds to step S1013, and if "registered" is determined the processing proceeds to step S1005.

If not "registered" is determined, the processing proceeds to step S1013. In step S1013, the CPU 202, by the cloud print activation processing unit 308, stores the cloud print version supported by the current firmware of the image forming apparatus 101 to the area for the cloud print operation version 501 of the non-volatile memory 214. After the processing of step S1013, the processing of FIG. 10 terminates.

Meanwhile, if "registered" is determined in step S1004, the processing proceeds to step S1005. In step S1005, the CPU 202, by the cloud print activation processing unit 308, displays on the display panel 405 a dialog screen 1101 of FIG. 11 that is for accepting an instruction of whether to delete cloud print service registration.

Here, if a button 1105 is pressed by a user, in other words if the user does not select deletion, the processing proceeds to step S1013. In step S1013, the CPU 202, by the cloud print activation processing unit 308, stores the cloud print version supported by the current firmware of the image forming apparatus 101 to the area for the cloud print operation version 501 of the non-volatile memory 214. Subsequently, the processing of FIG. 10 terminates.

When the button 1104 is pressed, in other words if a user instructed registration deletion, in step S1007 the CPU 202, by the cloud print activation processing unit 308, transmits a printer deletion command to the cloud print service 102. Here, the CPU 202 uses the API corresponding to the cloud print service of the old version to transmit the printer deletion command. Upon receiving a transmission result for the printer deletion command, the CPU 202, by the console control unit 300, displays that result on the display panel 405. For example, if the transmission result is deletion success, the console control unit 300 displays a dialog screen as illustrated by a screen 1102 of FIG. 11 on the display panel 405.

In step S1008, the CPU 202 sets, by the cloud print activation processing unit 308, the value of the cloud print registration status 502 of the non-volatile memory 214 to be a value indicating "unregistered". In step S1009, the CPU 202, by the cloud print activation processing unit 308, displays on the display panel 405 a dialog screen 1102 that is for accepting an instruction of whether to register the cloud print service.

FIG. 11 is a view illustrating an example of a dialog screen for accepting an instruction of whether to register a cloud print service. The CPU 202, by the console control unit 300, displays on the display panel 405 the dialog screen 1101, which can accept instruction for cloud print deletion. Here, if a button 1104 is pressed by a user, the cloud print service registration deletion processing of step S1007 and step S1008 is executed. In step S1009, the CPU 202, by the console control unit 300, displays on the display panel 405 a dialog screen 1102 for prompting cloud print service registration. As illustrated in the screen 1102, a message, "The registered cloud printer was deleted. Perform cloud print registration next?", is displayed on the screen. A button 1106 and a button 1107 are displayed on the screen 1102. If the button 1106 is pressed by a user, processing for registration of the cloud print service of FIG. 6 is performed. When the cloud print service registration processing succeeds, the CPU 202, by the console control unit 300, displays a screen 1103 on the display panel 405. In addition, when a button 1107 is pressed by a user, the processing proceeds to step S1013. In step S1013, the CPU 202, by the cloud print activation processing unit 308, stores the cloud print version supported by the current firmware of the image forming apparatus 101 to the area for the cloud print operation version 501 of the non-volatile memory 214. Subsequently, the processing of FIG. 10 terminates.

When the button 1103 on the screen 1101 is pressed, in other words if a user instructed registration addition, in step S1011 the CPU 202, by the cloud print activation processing unit 308, transmits the request for cloud print service registration 112 to the cloud print service 102. In step S1012, the CPU 202 stores, by the cloud print activation processing unit 308, a value for "registered" in the area for the cloud print registration status 502 of the non-volatile memory 214. In step S1013, the CPU 202, by the cloud print activation processing unit 308, stores the cloud print version supported by the current firmware of the image forming apparatus 101 to the area for the cloud print operation version 501 of the non-volatile memory 214. Subsequently, the processing of FIG. 10 terminates.

Third Embodiment

Next, regarding processing for automatically executing deletion and addition of a cloud print service, explanation is given regarding points different to the first and second embodiments as a third embodiment.

Figure 12:
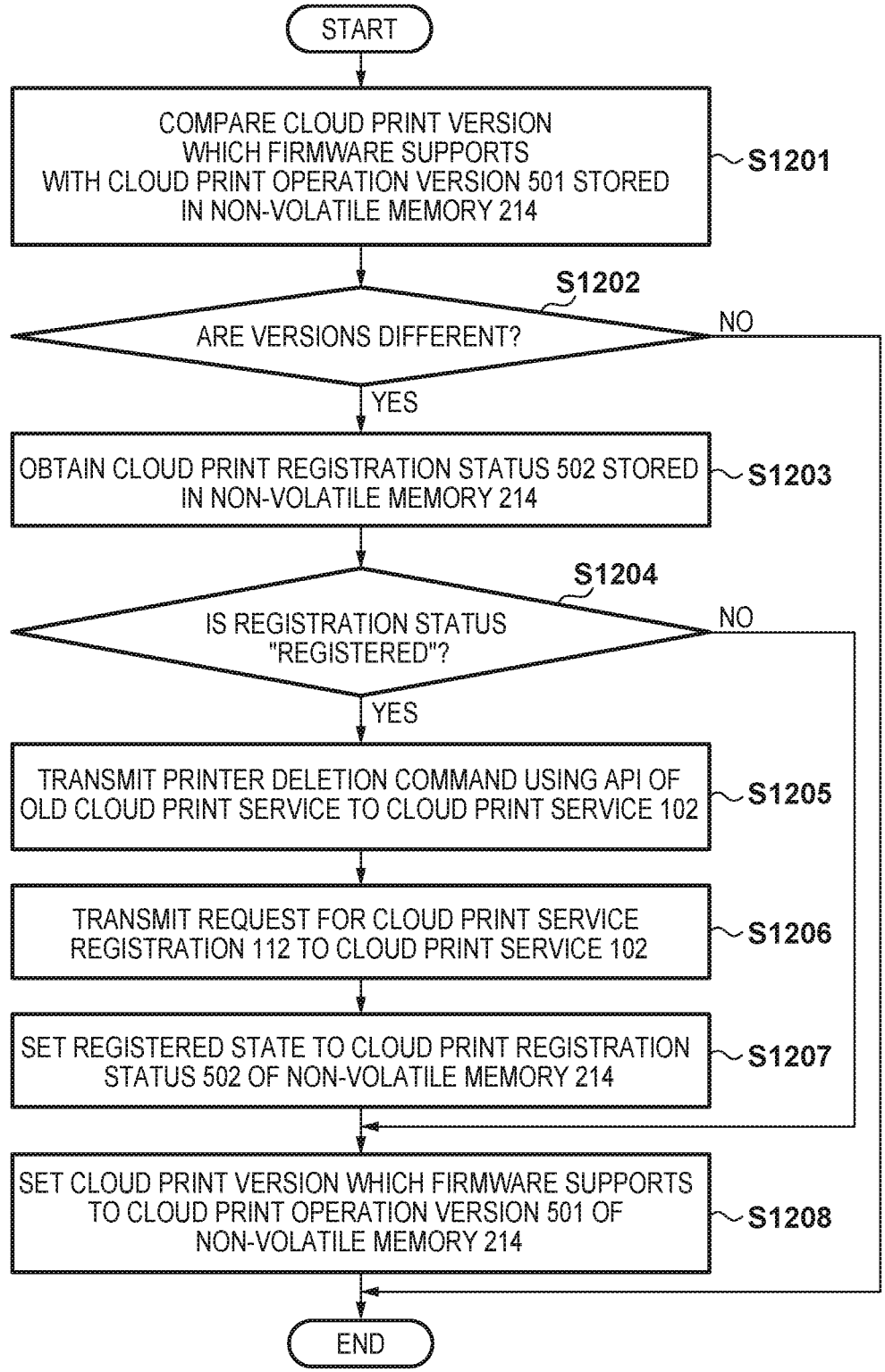
FIG. 12 is a flowchart illustrating processing at a time of activation of the image forming apparatus.

FIG. 12 is a flowchart illustrating processing when the image forming apparatus 101 activates, in the present embodiment. For example, each process of FIG. 12 is realized by the CPU 202 reading a program stored in the ROM 204 into the RAM 203 and executing it.

When the image forming apparatus 101 is activated, the processing of step S1201 is executed. In step S1201, the CPU 202, by the cloud print activation processing unit 308, compares the cloud print version supported by the current firmware of the image forming apparatus 101 with the cloud print operation version 501 stored in the non-volatile memory 214. In step S1202, the CPU 202, by the cloud print activation processing unit 308, determines whether both versions differ. Here, if it is determined that the versions do not differ and are the same, the processing of FIG. 12 terminates. Meanwhile, if is determined that the versions are different, in step S1203 the CPU 202, by the cloud print activation processing unit 308, obtains the value of the cloud print registration status 502 stored in the non-volatile memory 214. In step S1204, the CPU 202, by the cloud print activation processing unit 308, determines whether the obtained value is "registered". Here, if not "registered" is determined the processing proceeds to step S1208, and if "registered" is determined the processing proceeds to step S1205.

If not "registered" is determined, the processing proceeds to step S1208. In step S1208, the CPU 202, by the cloud print activation processing unit 308, stores the cloud print version supported by the current firmware of the image forming apparatus 101 to the area for the cloud print operation version 501 of the non-volatile memory 214. After the processing of step S1208, the processing of FIG. 12 terminates.

Meanwhile, if "registered" is determined in step S1204, in step S1205 the CPU 202, by the cloud print activation processing unit 308, transmits a printer deletion command to the cloud print service 102. Here, the CPU 202 uses the API corresponding to the cloud print service of the old version to transmit the printer deletion command. Upon receiving a transmission result for the printer deletion command, the CPU 202, by the console control unit 300, displays that result on the display panel 405. For example, if the transmission result is deletion success, the console control unit 300 displays a screen indicating that deletion succeeded on the display panel 405.

In step S1206, the CPU 202, by the cloud print activation processing unit 308, transmits the request for cloud print service registration 112 to the cloud print service 102. In step S1207, the CPU 202 stores, by the cloud print activation processing unit 308, a value indicating "registered" in the area for the cloud print registration status 502 of the non-volatile memory 214. In step S1208, the CPU 202, by the cloud print activation processing unit 308, stores the cloud print version supported by the current firmware of the image forming apparatus 101 to the area for the cloud print operation version 501 of the non-volatile memory 214. Subsequently, the processing of FIG. 12 terminates.

Fourth Embodiment

Figure 14A:
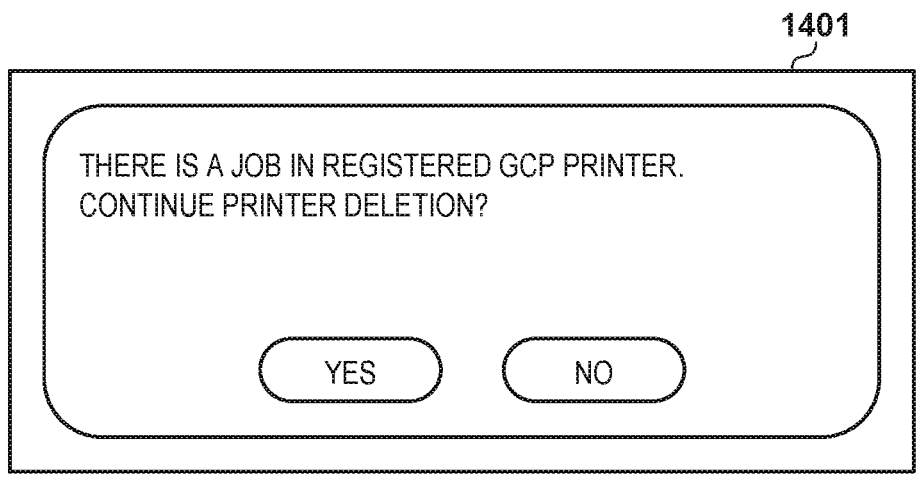
FIGS. 14A and 14B are views illustrating screens displaying that a job exists.

Although the first embodiment through to the third embodiment are explained above, configuration may be taken that operation of the present embodiment is performed when the button 903 of the screen 901 of FIG. 9 is pressed or when the button 1104 of the screen 1101 of FIG. 11 is pressed. In other words, when a deletion instruction for registration to the cloud print service 102 is accepted, a screen 1401 of FIG. 14A is displayed. As illustrated in FIG. 14A, a message of "There is a job in registered GCP printer. Continue printer deletion?" is displayed in the screen 1401. In the present embodiment, by such a configuration, it is possible to warn a user that there is an unprocessed job for the image forming apparatus 101 that is already registered to the cloud print service 102 that they are attempting to perform deletion. Here, if the "YES" button of the screen 1401 is pressed, deletion processing for the registration to the cloud print service 102 continues. Meanwhile, if the "NO" button is pressed, deletion processing for the registration to the cloud print service 102 is stopped.

Figure 14B:
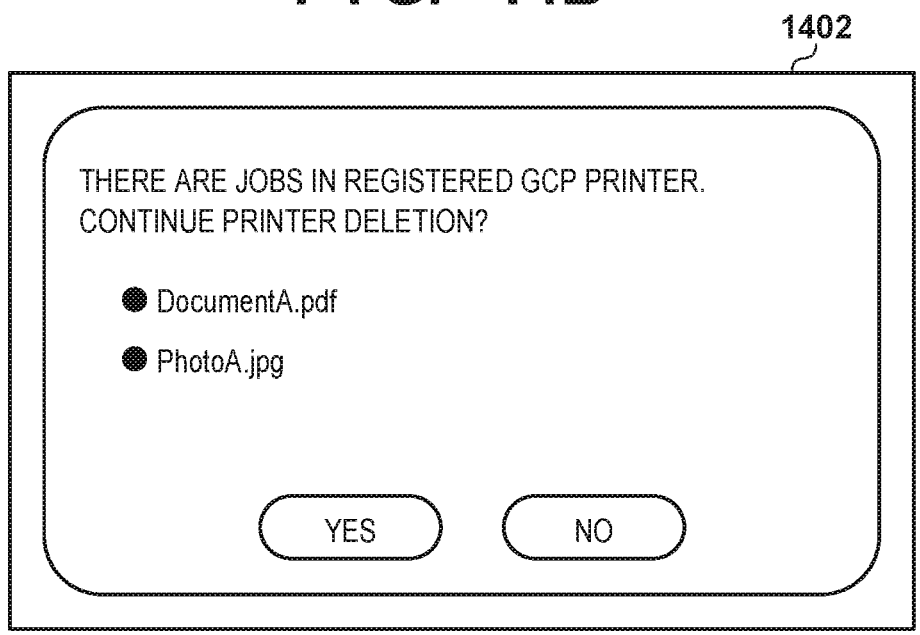

Alternatively, in the present embodiment, configuration may also be taken to display the screen 1402 of FIG. 14B if a deletion instruction for registration to the cloud print service 102 is accepted. In other words, in addition to notifying that there is an unprocessed job corresponding to the version already registered to the cloud print service 102 that the user is attempting to delete, a list of unprocessed jobs is displayed. Here, if the "YES" button of the screen 1401 is pressed, deletion processing for the registration to the cloud print service 102 continues. Meanwhile, if the "NO" button is pressed, deletion processing for the registration to the cloud print service 102 is stopped.

FIG. 13 is a flowchart illustrating processing for when the screen 901 of FIG. 9 or the screen 1101 of FIG. 11 are displayed. For example, each process of FIG. 13 is realized by the CPU 202 reading a program stored in the ROM 204 into the RAM 203 and executing it.

In step S1301, the processing of step S805 or step S1005 is performed. In other words, in step S1301, the screen 901 or the screen 1101 of FIG. 11 is displayed. In step S1302, the CPU 202 determines whether the button 903 or the button 1104 has been pressed, in other words whether a deletion instruction for registration to the cloud print service 102 has been accepted. Here, if it is determined that a deletion instruction for registration to the cloud print service 102 has not been accepted, the processing proceeds to step S1309. In step S1309, the CPU 202, by the cloud print activation processing unit 308, stores the cloud print version information supported by the current firmware of the image forming apparatus 101 to the area for the cloud print operation version 501 of the non-volatile memory 214. In other words, in step S1309, the processing of step S809 or step S1013 is performed. After the processing of step S1309, the processing of FIG. 13 terminates.

In step S1302, if it is determined that a deletion instruction for registration to the cloud print service 102 has not been accepted, the processing proceeds to step S1303. In step S1303, the CPU 202, by the cloud print service registration and deletion control unit 301, transmits to the cloud print service 102 a job list obtainment command for confirming whether there is a job corresponding to the registered image forming apparatus 101. In step S1304, the CPU 202, by the cloud print service registration and deletion control unit 301, performs a job determination for determining whether there is a job corresponding to the registered image forming apparatus 101, based on the job list received from the cloud print service 102. Here, if it is determined that a job is not present, it is determined that there will be no problem even if the deletion processing for the registration to the cloud print service 102 continues, and the processing proceeds to step S1307.

In step S1307, as in the processing in step S705, the CPU 202, by the cloud print service registration and deletion control unit 301, stores a value indicating "unregistered" to the area for the cloud print registration status 502 of the non-volatile memory 214. In step S1308, as in the processing in step S701, the CPU 202, by the cloud print service registration and deletion control unit 301, transmits a cloud print service deletion request to the cloud print service 102. Subsequently the processing proceeds to step S1309.

As described above, if a deletion instruction for registration to the cloud print service 102 is accepted, it is possible to warn a user that there is an unprocessed job corresponding to the image forming apparatus 101 already registered to the cloud print service 102, for which the user is attempting to perform deletion.

In the embodiments described above, the cloud print operation version 501 of the non-volatile memory 214 is information indicating a cloud print version supported by the firmware of the image forming apparatus 101 at the most recent activation. However, it may be information indicating the cloud print version supported by the firmware of the image forming apparatus 101 at the most recent registration to the cloud print service, instead of the cloud print version supported by the firmware of the image forming apparatus 101 at the most recent activation. In such a case, configuration may also be taken to cause processing to terminate if NO is determined in step S806. In this way, because a transition is made to the processing of step S803 and onward each time the image forming apparatus is activated in a state where it is determined in step S802 that the versions are different, it is possible to increase opportunities to prompt a user for deletion of the registration and re-registration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060900, filed Mar. 24, 2016, which is hereby incorporated by reference herein in its entirety.

What is claimed is:

1. An information processing apparatus comprising:
a memory configured to store instructions, and
a processor configured to execute the instructions to:
register, to a web service, a version of the web service supported by the information processing apparatus and identification information of the information processing apparatus, before an update of firmware of the information processing apparatus for communication with the web service;
perform the update of the firmware of the information processing apparatus for communication with the web service,
obtain a version of the web service supported by the information processing apparatus before the update as a first version;
obtain a version of the web service supported by the information processing apparatus after the update as a second version;
control a display unit to display information for allowing a user to confirm whether to delete registration of the version of the web service supported by the information processing apparatus before the update and the identification information, in a case where the first version and the second version differ from each other and it is determined that the version of the web service supported by the information processing apparatus before the update and the identification information are registered to the web service.

2. The information processing apparatus according to claim 1, wherein the processor is further configured to execute the instructions to receive from an external terminal a request for registration of the information processing apparatus to the web service, and when registering the information processing apparatus to the web service in accordance with reception of the request for registration, notify the web service of the version of the web service supported by the information processing apparatus, and request a user of the external terminal to issue the request for registration again in a case where the first version and the second version differ from each other.

3. The information processing apparatus according to claim 1, wherein the processor is further configured to execute the instructions to request the web service to delete the registration of the information processing apparatus from the web service.

4. The information processing apparatus according to claim 1, wherein the processor is further configured to execute the instructions to, in accordance with accepting from the user an instruction for deletion, determine whether there is a job corresponding to the first version, and notify a result of the determination to the user.

5. The information processing apparatus according to claim 4, wherein the processor is further configured to execute the instructions to, display a list of the corresponding jobs after the notification of the result of the determination.

6. The information processing apparatus according to claim 1, wherein the processor is further configured to execute the instructions to provide notification that the version of the web service supported by the firmware of the information processing apparatus registered to the web service is different to a version of the web service that the information processing apparatus can support.

7. The information processing apparatus according to claim 1, further comprising a storage unit configured to store the version of the web service before the update that is notified from the information processing apparatus to the web service for registration to the web service that is performed before the update, wherein the storage unit continues to hold version information of the web service before and after the update of the firmware, wherein the processor is further configured to execute the instructions to obtain, before the update, a version of the web service from the storage unit as the first version, and obtain, after the update, a version of the web service as the second version by examining the firmware.

8. The information processing apparatus according to claim 7, wherein the obtaining of the first version and the obtaining of the second version are performed after activation of the information processing apparatus accompanying an update of the firmware.

9. The information processing apparatus according to claim 1, wherein the information processing apparatus is a printing apparatus, and the web service is a print service for accepting a print job from an external terminal, processing the accepted print job, and transmitting the processed print job to the printing apparatus.

10. A method of controlling an information processing apparatus for communicating with a web service that is registered to the web service, the method comprising:

registering, to a web service, a version of the web service supported by the information processing apparatus and identification information of the information processing apparatus, before an update of firmware of the information processing apparatus for communication with the web service;

updating the firmware of the information processing apparatus for communicating with the web service, obtaining a version of the web service supported by the information processing apparatus before the update as a first version;

obtaining a version of the web service supported by the information processing apparatus after the update as a second version; and controlling a display unit to display information for allowing a user to confirm whether to delete registration of the version of the web service supported by the information processing apparatus before the update and the identification information, in a case where the first version and the second version differ from each other and it is determined that the version of the web service supported by the information processing before the update and the identification information are registered to the web service.

11. A non-transitory computer-readable storage medium storing a program for causing an information processing apparatus to perform registering, to a web service, a version of the web service supported by the information processing apparatus and identification information of the information processing apparatus, before an update of firmware of the information processing apparatus for communication with the web service;

updating the firmware of the information processing apparatus for communicating with a web service, obtaining a version of the web service supported by the information processing apparatus before the update as a first version;

obtaining a version of the web service supported by the information processing apparatus after the update as a second version;

controlling a display unit to display information for allowing a user to confirm whether to delete registration of the version of the web service supported by the information processing apparatus before the update and the identification information, in a case where the first version and the second version differ from each other and it is determined that the version of the web service supported by the information processing apparatus before the update and the identification information are registered to the web service.

* * * * *